(12) United States Patent
Copeland et al.

(10) Patent No.: US 11,105,446 B1
(45) Date of Patent: Aug. 31, 2021

(54) REINFORCED PLASTIC PIPE BELL AND METHOD OF MAKING SAME

(71) Applicant: McWane, Inc., Birmingham, AL (US)

(72) Inventors: Daniel A. Copeland, Bessemer, AL (US); Charles Stirling Snow, Indian Springs, AL (US)

(73) Assignee: MCWANE, INC., Birmingham, AL (US)

( * ) Notice: Subject to any disclaimer, the term of this patent is extended or adjusted under 35 U.S.C. 154(b) by 176 days.

(21) Appl. No.: 16/527,364

(22) Filed: Jul. 31, 2019

(51) Int. Cl.
*F16L 9/133* (2006.01)

(52) U.S. Cl.
CPC .................................... *F16L 9/133* (2013.01)

(58) Field of Classification Search
CPC . F16L 47/22; F16L 47/12; F16L 21/03; B29C 66/74711; B29C 66/8264
USPC .................. 138/109, 110, 172; 285/261, 379
See application file for complete search history.

(56) References Cited

U.S. PATENT DOCUMENTS

| | | | | |
|---|---|---|---|---|
| 4,532,168 A | * | 7/1985 | Steele | B29C 61/0633 |
| | | | | 428/99 |
| 10,288,199 B2 | * | 5/2019 | Copeland | B21D 39/04 |
| 2017/0328503 A1 | * | 11/2017 | Copeland | B21D 39/046 |
| 2018/0094754 A1 | * | 4/2018 | Quesada | F16L 37/0845 |
| 2019/0195409 A1 | * | 6/2019 | Corbett, Jr. | B29C 66/1122 |

* cited by examiner

*Primary Examiner* — Patrick F Brinson
(74) *Attorney, Agent, or Firm* — C. Brandon Browning; Maynard, Cooper & Gale, PC

(57) ABSTRACT

The present disclosure generally pertains to methods and systems for reinforcing a plastic pipe bell. The disclosure may include arranging a sleeve fabricated from a heat shrinkable plastic around the plastic pipe bell, and shrinking the sleeve around the plastic pipe bell thereby forming a first interference fit between the sleeve and the plastic pipe bell. The disclosure may further include inserting a spigot into the plastic pipe bell and shrinking the sleeve around the spigot thereby and forming a second interference fit directly between the sleeve and the spigot.

18 Claims, 5 Drawing Sheets

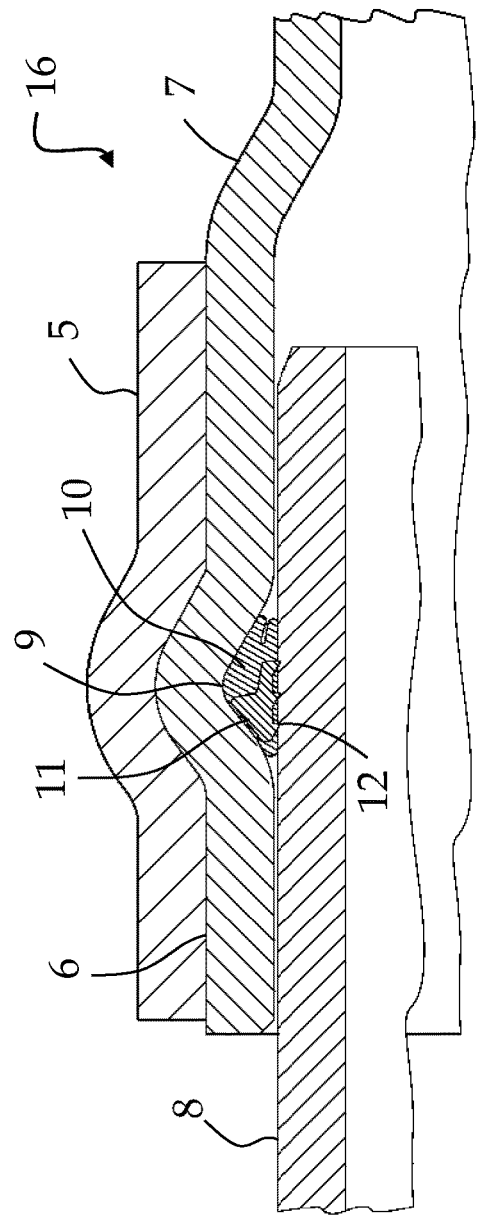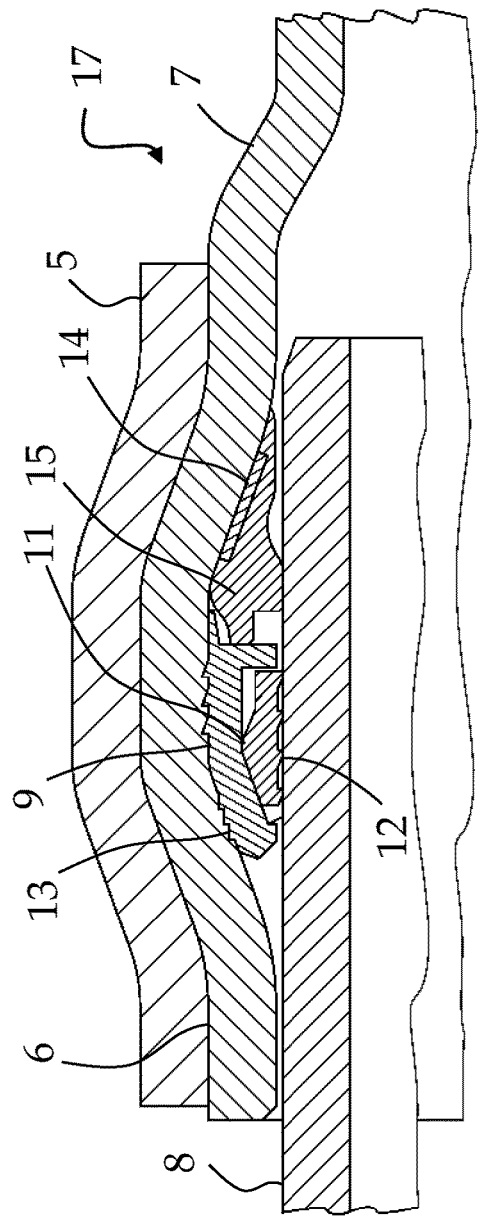
FIG. 4
FIG. 5

REINFORCED PLASTIC PIPE BELL AND METHOD OF MAKING SAME

FIELD OF THE INVENTION

The present invention is directed to a reinforced plastic pipe bell and method of making same and, more particularly, to a plastic pipe bell reinforced by shrinking a heat shrinkable plastic sleeve around the plastic pipe bell.

BACKGROUND OF THE INVENTION

Pipe joint gaskets including locking segments for preventing the separation of interconnected, telescoping plastic pipes in applications where a fluid such as water for fire mains is held under high pressure are known in the art. For example, U.S. Pat. No. 10,288,199 to Copeland, the entire contents of which are incorporated herein by reference, discloses a plastic pipe joint including a polyvinyl chloride (PVC) pipe having a bell and a gasket seated within an annular groove of the bell. A plurality of locking segments are embedded in the gasket, each segment including a first tooth extending towards the opening in the gasket and a second tooth extending towards a front radial wall of the annular groove. The first tooth and the second tooth are arranged to impinge upon the spigot and the front radial wall of the annular groove, respectively, upon pressurization of the pipe joint. Additional U.S. patents and U.S. patent application publications disclosing internally restrained plastic pipe joints include U.S. Pat. Nos. 7,618,071 and 7,537,248 and U.S. Patent Application Publication Nos. 2019/0162342, 2017/0328503 and 2017/0370505, the entire contents of which are incorporated herein by reference.

A shortcoming of relying upon gaskets containing toothed locking segments for restraining plastic pipe joints is that the toothed locking segments may destructively impinge upon the plastic pipes, particularly plastic pipe bells, thereby resulting in leaks. Consequently, the use of gaskets containing locking segments has been limited, especially in high pressure applications. Instead, plastic pipes, such as those formed from thermoplastic materials including polyethylene, polybutylene, polypropylene and PVC, are typically joined together by means of a bell-and-spigot gasket-sealed joint utilizing gaskets often referred to as Rieber gaskets. Rieber gaskets fail to restrain axial separation of plastic pipes along a joint upon fluid pressurization of, or the occurrence of thrust forces within, the pipe joint at high pressure. Thus, to restrain plastic pipes, external harnesses and other mechanical joint type glands must be used, which is problematic since installation of such harnesses and external glands can be time-consuming and expensive.

Accordingly, a system is needed for quickly and inexpensively restraining axial separation of plastic pipes along a joint upon fluid pressurization of the pipe joint at high pressure. A need also exists for a method of restraining axial separation of plastic pipes that does not negatively affect the integrity of the plastic pipes. Furthermore, there is a need for a system for preventing toothed locking segments in internally restrained pipe joints from destructively impinging upon plastic pipe bells.

SUMMARY OF THE INVENTION

The present invention is directed to a reinforced plastic pipe bell and method. The invention is based upon the discovery that damage caused to internally restrained plastic pipe joints by gaskets containing toothed, metal locking segments which are seated within the annular grooves of the plastic pipe bells can be prevented by reinforcing the plastic bells with heat shrinkable plastic pipe sections. According to one aspect of the invention there is provided a method of reinforcing a plastic pipe bell, the method including arranging a sleeve fabricated from a heat shrinkable plastic around the plastic pipe bell and shrinking the sleeve around the plastic pipe bell thereby forming a first interference fit between the sleeve and the plastic pipe bell. The heat shrinkable sleeve may be constructed of a heat shrinkable plastic such as molecularly oriented polyvinyl chloride (PVCO) and shrunk by heating the sleeve to a temperature that is between the glass transition temperature, i.e., 185° F. and the melting temperature, i.e. 464° F., of the heat shrinkable plastic. To ensure uniform shrinking of the sleeve, the sleeve is heated uniformly, while precautions are taken to limit the amount of heat transferred to the plastic pipe bell thereby preventing deformation of the bell. Suitable means for heating the sleeve may include the use of a heated forced air device similar to a hair dryer, a heating pad, a microwave device, a heat lamp, an oven, a pouch containing components that selectively create an exothermic reaction and thus heat and a heated liquid bath containing, for example, heated water, heated oil, heated ethylene glycol or combinations of any of the forgoing. In certain instances, more than one of the various heat sources may be used to heat the and shrink the sleeve.

Prior to shrinking the sleeve, the sleeve may comply with American National Standards Institute (ANSI) and American Water Works Association (AWWA) standard ANSI/AWWA C909. However, after forming the first interference fit between the sleeve and the plastic pipe bell, the sleeve may not comply ANSI/AWWA C909.

The method may be carried out in a factory setting subsequent to formation of the plastic pipe bell or in the field where the pipe is to be installed, for example, in a truck, trailer or van or alongside or within a pipe trench. The method may also be carried out after the pipe joint is formed, i.e., after a spigot is inserted into the plastic pipe bell. Thus, the sleeve can be shrunk around the spigot thereby forming a second interference fit directly between the sleeve and the spigot.

In use, a gasket is seated within an annular groove of the plastic pipe bell and a spigot is inserted into the plastic bell end and through the gasket. A toothed locking segment embedded in the gasket impinges against the spigot and the annular groove upon pressurization of the joint thereby preventing axial separation of the spigot form the bell. If exposed to high internal pressure, over penetration of the segment teeth into the bell does not cause joint failure because of the presence of the reinforced sleeve.

According to another aspect of the invention, there is provided a pipe bell reinforcement system including a heat shrinkable sleeve arranged concentrically around a plastic pipe bell. The heat shrinkable sleeve may be fabricated from a molecularly oriented polyvinyl chloride (PVCO) that is shrunk around the bell thereby forming an interference fit between the bell and the sleeve. The plastic pipe bell may include an annular groove and a gasket seated within the annular groove, the gasket including a plurality of toothed locking segments at least partially embedded in the gasket. When shrunk around the bell, the sleeve conforms to the exterior contour of the bell including the contour of the annular groove. In use, a spigot is operatively coupled to the plastic pipe bell wherein a toothed locking segment of the plurality of toothed locking segments includes a first tooth impinging upon the spigot and a second tooth impinging upon the plastic pipe bell. The sleeve effectively increases the thickness of the bell and reduces the likelihood that the second tooth impinging upon the plastic pipe bell will cause a mechanical failure of the bell.

According to another aspect of the invention, there is provided a method of reinforcing a plastic pipe bell including providing a polyvinyl chloride (PVC) pipe having a bell with an annular groove, arranging a molecularly oriented polyvinyl chloride (PVCO) pipe around the bell, and causing the PVCO pipe to shrink around the PVC pipe bell thereby rigidly coupling the PVCO pipe to the PVC pipe. As the PVCO pipe shrinks around the bell, the PVCO pipe sidewall increases in thickness as the pipe attempts to return to its pre-stressed state. The method may further include forming a plastic pipe joint by seating a gasket in the annular groove and inserting a spigot into the bell and through the gasket. The method may be used with any number of plastic pipe bell and/or gasket configurations including, for example, the configurations described in U.S. Pat. Nos. 10,288,199; 7,618,071 and 7,537,248 and U.S. Patent Application Publication Nos. 2019/0162342; 2017/0328503 and 2017/0370505.

BRIEF DESCRIPTION OF THE DRAWINGS

The methods and systems for reinforcing a plastic pipe bell can be better understood, by way of example only, with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 4 is a sectional view of a restrained plastic pipe joint comprising the reinforced plastic pipe bell of FIG. 2.

FIG. 5 is a sectional view of a restrained plastic pipe joint comprising the shrinkable plastic sleeve of FIG. 1 in accordance with a second embodiment of the present invention.

DETAILED DESCRIPTION

The present disclosure is directed to systems and methods of reinforcing a plastic pipe bell 7 or pipe joint using a plastic sleeve 5. The disclosure includes embodiments where plastic pipe bell 7 is reinforced with plastic sleeve 5 before or after a spigot 8 is inserted into plastic pipe bell 7. The reinforcing of plastic pipe bell 7 is accomplished by utilizing a heat source to shrink plastic sleeve 5 tightly about the contours of pipe bell 7 or a pipe joint including spigot 8 inserted into pipe bell 7. Reinforcement may occur in a factory setting or within a pipe trench or other location in the field where the pipe is to be installed.

Embodiments of the present disclosure are illustrated by way of example in FIGS. 1-7. It should be noted that all terms as used herein are given their common meaning as known in the art and as further described and discussed hereafter. As used herein, the singular forms "a", "an", and "the" include plural referents unless the context clearly indicates otherwise.

Figure 1:
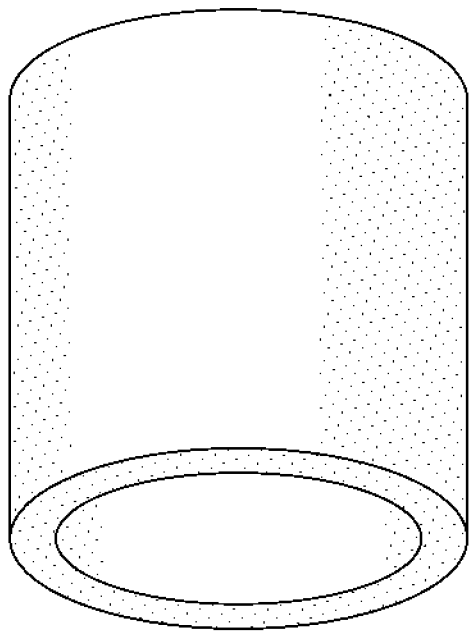
FIG. 1 is a perspective view of a shrinkable plastic sleeve for reinforcing a plastic pipe bell in accordance with the present invention.

FIG. 1 depicts shrinkable plastic sleeve 5 for the reinforcement methods and systems of the present invention. Plastic sleeve 5 is fabricated from molecularly oriented polyvinyl (PVCO) or any other suitable material such that it may be fitted tightly to reinforce a pipe component or assembly. Molecularly oriented polyvinyl (PVCO) plastic pipe is PVC pressure pipe that attains a relatively high circumferential strength by reorienting the molecules. To create PVCO pipe, conventionally extruded PVC pipe is expanded circumferentially (e.g., 4-in. diameter starting stock pipe is conventionally extruded and then heated and expanded to 8-in. diameter) using pressure and temperature. The expansion reorients the PVC molecular structure in the hoop direction thereby increasing the material strength in the hoop direction. Depending on the expansion process used, some longitudinal stretching is also possible. Starting stock pipe is conventionally extruded PVC pipe of uniform wall thickness that is expanded to a larger diameter to orient the molecular structure.

Plastic sleeve 5 is in a shape of a cylinder, or any other suitable shape such that it may be arranged around an exterior surface of a pipe to be reinforced. Plastic sleeve 5 is produced or fitted to a length such that it may cover and reinforce at least a desired length of pipe or assembly of pipes. Prior to shrinking plastic sleeve 5, plastic sleeve 5 complies with American National Standards Institute (ANSI) and American Water Works Association (AWWA) standard ANSI/AWWA C909. The shrinking of plastic sleeve 5 occurs at a temperature that is between the glass transition temperature and the melting temperature of the heat shrinkable plastic.

Figure 2:
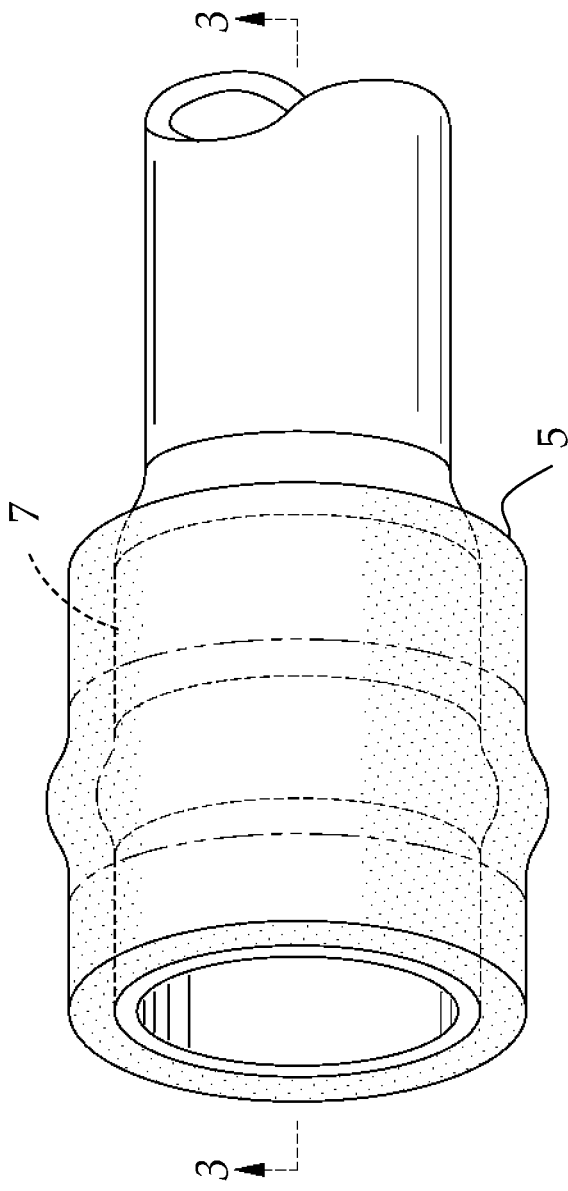
FIG. 2 is a perspective view of a plastic pipe bell reinforced by the shrinkable plastic sleeve of FIG. 1 in accordance with a first embodiment of the present invention.

As illustrated in a first embodiment in FIG. 2, plastic pipe bell 7 is reinforced by the shrinkable plastic sleeve 5 of FIG. 1. Plastic sleeve 5 is shrunk, upon application of heat, to conform to the exterior surface and geometry of plastic pipe bell 7, thus providing reinforcement. Plastic pipe bell 7 is fabricated from polyvinyl chloride (PVC) or any other such suitable material for adequate pipe construction, gasket insertion, and assembled pipe function. PVC plastic resin is a polymer derived from saltwater, air and natural gas or petroleum. PVC resin may be combined with heat stabilizers, lubricants and other ingredients to make PVC compounds that can be extruded into pipe or molded into fittings. Plastic pipe bell 7 complies with American National Standards Institute (ANSI) and American Water Works Association (AWWA) standard ANSI/AWWA C900 or C905.

Prior to shrinking, heat shrinkable plastic sleeve 5 is arranged concentrically around plastic pipe bell 7 to form a pipe bell reinforcement system. The shrinking of plastic sleeve 5 is accomplished using a heat source that applies heat uniformly to plastic sleeve 5 so that it may shrink without damaging the surface or shape of plastic pipe bell 7. The heat source may be selected from a group consisting of a heated liquid bath, a heated forced air device, a heating pad, a microwave device, a heat lamp, an electric heating blanket, an oven, a pouch containing components that selectively create an exothermic reaction. Suitable fluids include water, oil, and ethylene glycol. In the instance where the heat source is a heated liquid bath, a volume of liquid, such as water, is placed in a container and heated by any means known in the art. One, several, or many plastic sleeves 5 are then submerged in the liquid and slowly heated by the heated liquid. Each plastic sleeve 5 is removed from the heated liquid bath prior to shrinking to a size that is smaller than that of pipe bell 7, such that each plastic sleeve 5 may be applied around each bell pipe 7 to be reinforced. If further heating of the sleeve 5 is necessary to obtain the desired fit between the sleeve and pipe bell 7, sleeve 5 may be further heated while arranged around the pipe bell using any of the heat sources identified herein. As PVCO plastic sleeve 5 shrinks around pipe bell 7, the PVCO sleeve sidewall increases in thickness as the pipe attempts to return to its pre-stressed state which serves to reinforce pipe bell 7 as the PVCO rigidly couples to the PVC pipe. An interference fit is formed between plastic sleeve 5 and plastic pipe bell 7 after plastic sleeve 5 has shrunk around plastic pipe bell 7. After forming the interference fit between plastic sleeve 5 and plastic pipe bell 7, plastic sleeve 5 no longer complies with ANSI/AWWA C909.

Figure 3:
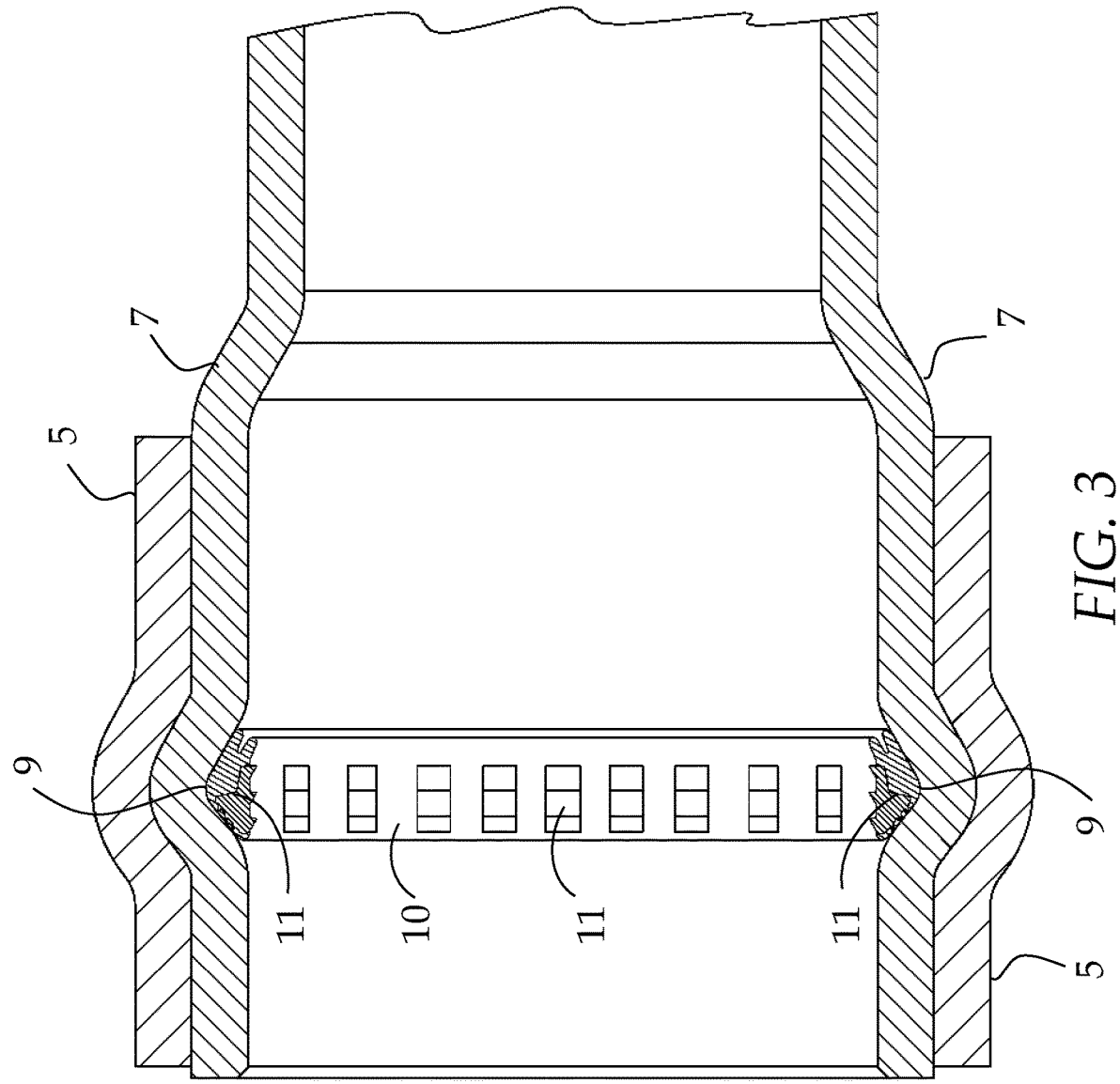
FIG. 3 is a sectional view of the reinforced plastic pipe bell of FIG. 2 along line 3-3.

FIG. 3 is the cross section of reinforced plastic pipe bell 7 of FIG. 2, and illustrates gasket 10 within annular groove 9 of pipe bell 7. Annular groove 9 may be substantially V-shaped, arched, or U-shaped in cross section or may be of any cross sectional shape such that gasket 10 may be securely seated within annular groove 9. Seated within annular groove 9 of pipe bell 7 is gasket 10 including a plurality of toothed locking segments 11. Toothed locking segments 11 are at least partially embedded in gasket 10 and uniformly spaced along the circumference of gasket 10. The number of toothed locking segments 11 may be increased or decreased as required by higher or lower pressure applications, respectively, for the installed pipes. Any number of plastic pipe bell 7, annular groove 9 and/or gasket 10 configurations including, for example, the configurations described in U.S. Pat. Nos. 10,288,199; 7,618,071 and 7,537,248 and U.S. Patent Application Publication Nos. 2019/0162342; 2017/0328503 and 2017/0370505, are contemplated for use in the present disclosure.

FIG. 4 depicts a plastic pipe joint 16 including spigot 8 inserted into reinforced pipe bell 7 of FIG. 3. Spigot 8 is inserted through gasket 10 seated in annular groove 9 of pipe bell 7 to form plastic pipe joint 16. Spigot 8 is fabricated from polyvinyl chloride (PVC) or any other such suitable material for adequate pipe construction, insertion, and assembled pipe function. Spigot 8 complies with American National Standards Institute (ANSI) and American Water Works Association (AWWA) standard ANSI/AWWA C900. Toothed locking segments 11 of gasket 10 include at least one set of teeth, which may be pointed directed away from the end of pipe bell 7 through which spigot 8 may be inserted, such that the teeth may lock spigot 8 in its inserted location. In the embodiment shown in FIG. 4, a first tooth 12 may be located on an interior face of toothed locking segments 11 such that first tooth 12 impinges upon an inserted spigot 8. Reinforcement reduces or prevents of toothed locking segments 11 of gasket 10 from destructively impinging on plastic pipe bell 7. Reinforced plastic pipe joint 16 may also reduce or prevents axial movement or separation of spigot 8 following its insertion into plastic pipe bell 7.

Referring to FIG. 5, there is depicted a plastic pipe joint 17 including spigot 8 inserted into pipe bell 7 of FIG. 2 including an alternative restraint mechanism. In this embodiment, annular groove 9 includes an elastomeric, circumferential sealing ring 15 which is formed as an elastomeric body. The sealing member is preferably made of a resilient elastomeric or thermoplastic material. Sealing ring 15 has a metal reinforcing band 14 about the outer circumference thereof. The seal and restraint system of the invention also includes a ring shaped housing 13 having a circumferential interior region and an exterior. The exterior of housing 13 is equipped with one or more rows of gripping teeth for engaging annular groove 9. A companion ring-shaped gripping insert 12 is received within a circumferential interior region of housing 13. Gripping insert 12 has an interior surface with at least one row of gripping teeth for engaging spigot 8.

In some embodiments, depicted in FIGS. 4-5, pipe bell 7 is reinforced by plastic sleeve 5 prior to the insertion of spigot 8, thus forming a plastic pipe joint. In these embodiments, spigot 8 is inserted into the pipe bell end and through gasket 10, impinging the acutely pointed teeth of at least one toothed locking segment 11 embedded in gasket 10 against spigot 8 and annular groove 9. Following insertion, spigot 8 is operatively coupled to plastic pipe bell 7.

Figure 6:
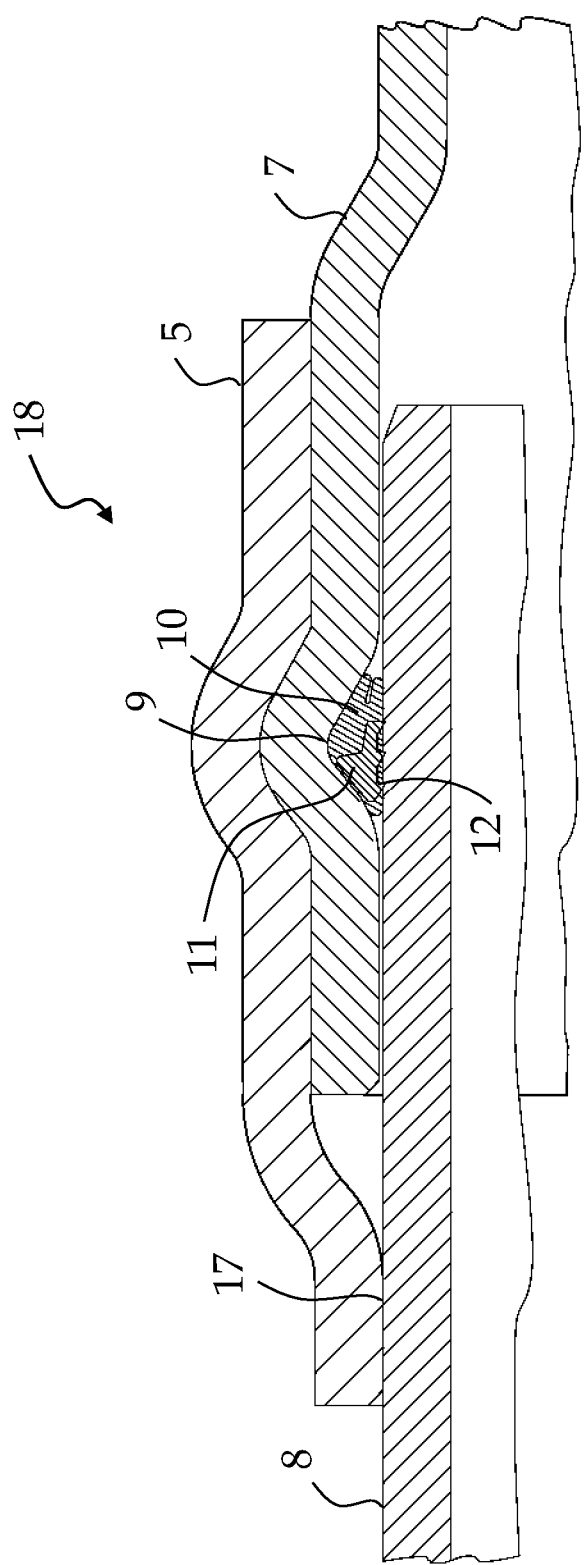
FIG. 6 is a sectional view of a reinforced plastic pipe joint in accordance with a third embodiment of the present invention.

In other embodiments, such as a third embodiment shown in FIG. 6, spigot 8 is inserted into plastic pipe bell 7 prior to the shrinking of plastic sleeve 5 around spigot 8 and pipe bell 7. In these embodiments, plastic sleeve 5 conforms to the geometry and features of pipe bell 7 and spigot 8 and plastic sleeve 5 and pipe bell 7 upon application of heat. An interference fit is formed directly between plastic sleeve 5 and spigot 8 to form a joint 18.

The methods of the present invention may be carried out in a factory setting subsequent to formation of plastic pipe bell 7 or in the field during installation of the pipe. Locations in the field may be, for example, in a truck, trailer or van or alongside or within a pipe trench. In a field setting, a heat source may be sufficiently portable and effective for the uniform heating of plastic sleeve 5 such that it may shrink.

Figure 7:
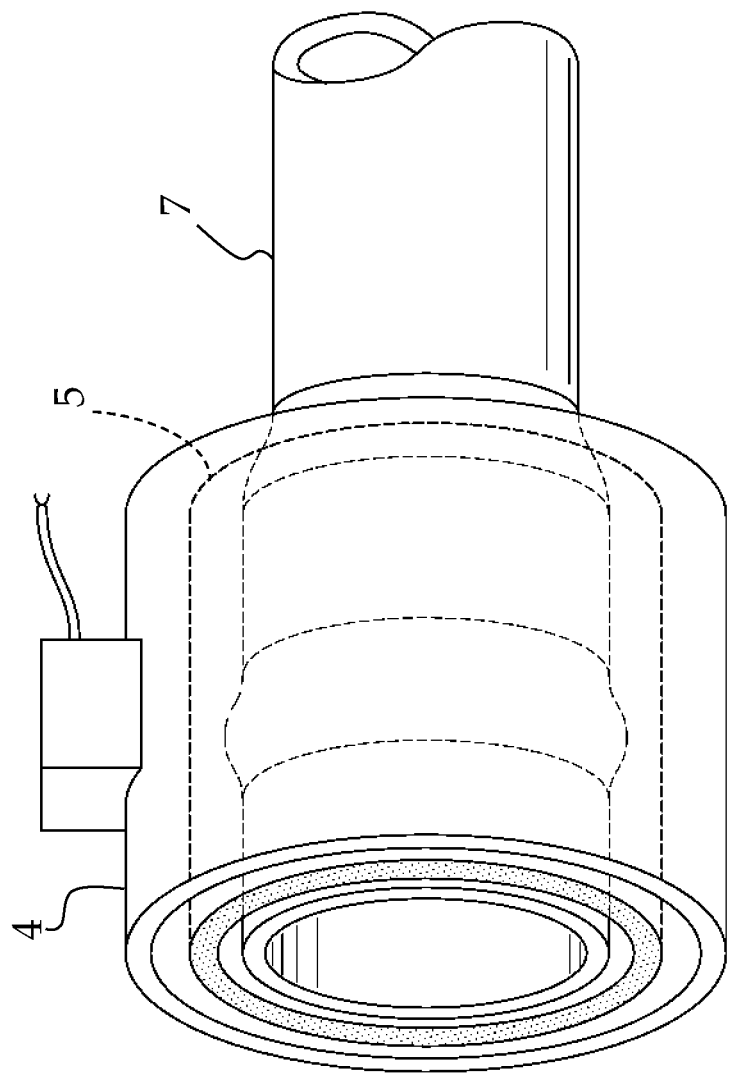
FIG. 7 is a sectional view of a heating pad device for heating and shrinking a single shrinkable plastic sleeve around a plastic pipe bell.

FIG. 7 depicts one embodiment of an exemplary heat source, such as a heating pad device 4, uniformly heating and prompting the shrinking of plastic sleeve 5 around the exterior surface and contours of pipe bell 7. Heating pad device 4 of FIG. 7 may be appropriate for use in a field location, as described above. Additionally, the heating pad device 4 may, in embodiments not depicted, be used to create the second interference fit between spigot 8 and plastic sleeve 5 in the instance where spigot 8 is inserted into plastic pipe bell 7 prior to reinforcement.

As will be apparent to one skilled in the art, various modifications can be made within the scope of the aforesaid description. Such modifications being within the ability of one skilled in the art form a part of the present invention and are embraced by the claims below. For example, it is contemplated that gasket 10 of the present disclosure can be used to form a restrained seal between a bell of a metal pipe and a spigot of a plastic pipe or between a polystyrene bell and a plastic spigot. Additionally, the segments may be arranged in groups numbering two segments per group and more than three segments per group, such as four segments per group, five segments per group and six segments per group.

We claim:
1. A method of reinforcing a plastic pipe bell having an annular groove, the method comprising:
    arranging a sleeve fabricated from a heat shrinkable plastic around the plastic pipe bell and the annular groove, and
    shrinking the sleeve around the plastic pipe bell thereby forming a first interference fit between the sleeve and the plastic pipe bell, wherein, when the sleeve shrinks around the plastic pipe bell, the sleeve, at least in part, conforms to a shape of the annular groove.

2. The method of claim 1 wherein the heat shrinkable plastic is molecularly oriented polyvinyl chloride (PVCO).

3. The method of claim 1 including shrinking the sleeve by heating the sleeve to a temperature that is between a glass transition temperature and a melting temperature of the heat shrinkable plastic.

4. The method of claim 1 including heating the sleeve with a heat source selected from the group consisting of a heated liquid bath, a heated forced air device, a heating pad, a microwave device, a heat lamp, an oven, a pouch containing components that selectively create an exothermic reaction, heated water, superheated steam, heated oil, heated ethylene glycol and heated air.

5. The method of claim 1 including shrinking the sleeve around the plastic pipe bell while the plastic pipe bell is located within a trench.

6. The method of claim 1 including inserting a spigot into the plastic pipe bell and shrinking the sleeve around the spigot thereby and forming a second interference fit directly between the plastic pipe bell and the spigot.

7. The method of claim 1 including seating a gasket and a toothed locking member within the annular groove of the plastic pipe bell, inserting a spigot into the plastic bell end and through the gasket and impinging the toothed locking member against the spigot and the annular groove.

8. The method of claim 1 wherein the sleeve complies with American National Standards Institute (ANSI) and American Water Works Association (AWWA) standard ANSI/AWWA C909 prior to shrinking the sleeve.

9. The method of claim 8 wherein the sleeve does not comply ANSI/AWWA C909 after forming the first interference fit between the sleeve and the plastic pipe bell.

10. The method of claim 1 wherein the plastic pipe bell complies with American National Standards Institute (ANSI) and American Water Works Association (AWWA) standard ANSI/AWWA C900.

11. The method of claim 1 wherein the heat shrinkable plastic is molecularly oriented polyvinyl chloride (PVCO) pipe.

12. A pipe bell reinforcement system comprising:
a heat shrinkable plastic sleeve arranged concentrically around a plastic pipe bell and an annular groove of the plastic pipe bell,
and an interference fit formed by and between the plastic sleeve and the plastic pipe bell.

13. The system of claim 12 wherein the plastic sleeve is fabricated from molecularly oriented polyvinyl chloride (PVCO).

14. The system of claim 12 wherein the plastic pipe bell includes a gasket and a plurality of toothed locking segments seated within the annular groove.

15. The system of claim 14 including a spigot operatively coupled to the plastic pipe bell wherein a toothed locking segment of the plurality of toothed locking segments includes a first tooth impinging upon the spigot and a second tooth impinging upon the plastic pipe bell.

16. A method of reinforcing a plastic pipe bell comprising:
providing a polyvinyl chloride (PVC) pipe having a bell with an annular groove,
arranging a molecularly oriented polyvinyl chloride (PVCO) pipe around the bell, and
causing the PVCO pipe to shrink around the PVC pipe thereby rigidly coupling the PVCO pipe to the PVC pipe,
wherein, when the PVCO pipe shrinks around the bell, the PVCO pipe, at least in part, conforms to a shape of the annular groove.

17. The method of claim 16 including forming a plastic pipe joint by seating a gasket in the annular groove and inserting a spigot into the bell and through the gasket.

18. The method of claim 16 wherein the gasket is a Rieber gasket and the annular groove further includes a restraint casing and a restraining ring.

\* \* \* \* \*